United States Patent [19] [11] 4,071,599
Walker [45] Jan. 31, 1978

[54] TUBULAR MEMBER AND PROCESS OF FORMING A TUBULAR MEMBER
[75] Inventor: Grant W. Walker, Sacramento, Calif.
[73] Assignee: Energy Absorption Systems, Inc., Chicago, Ill.
[21] Appl. No.: 390,171
[22] Filed: Aug. 20, 1973
[51] Int. Cl.[2] .......................... B29C 5/04; B29D 3/02
[52] U.S. Cl. .................................. 264/311; 264/269; 264/270; 264/271
[58] Field of Search .............. 264/310, 311, 269, 270, 264/294

[56] References Cited
U.S. PATENT DOCUMENTS

| 3,012,922 | 12/1961 | Wiltshire | 264/311 |
| 3,150,219 | 9/1964 | Schmidt | 264/311 |
| 3,783,060 | 1/1974 | Goldsworthy et al. | 264/311 |

Primary Examiner—Willard E. Hoag
Attorney, Agent, or Firm—Lothrop & West

[57] ABSTRACT

A process for forming a tubular member includes rotating a tubular form about a central axis. The form is provided with an interior coating of time-setting, liquid material. A number of lengths or strips of roving, preferably of fiber glass, are introduced serially into the rotating tubular form in a direction substantially chordally of the tubular form so that each roving strip tends to be embedded approximately circumferentially by centrifugal force into the liquid material. The roving strips are approximately as long as the diameter of the tubular form and in effect make a helix. The material hardens with the roving embedded therein. The hardened material and roving are then removed as a tubular member from the stationary form. The product of the invention is a member of tubular shape comprised of a helix formed of substantially circumferentially extending lengths of fiber glass roving, each length being approximately the diameter of the tube, all embedded in a solid matrix of time-setting material.

4 Claims, 2 Drawing Figures

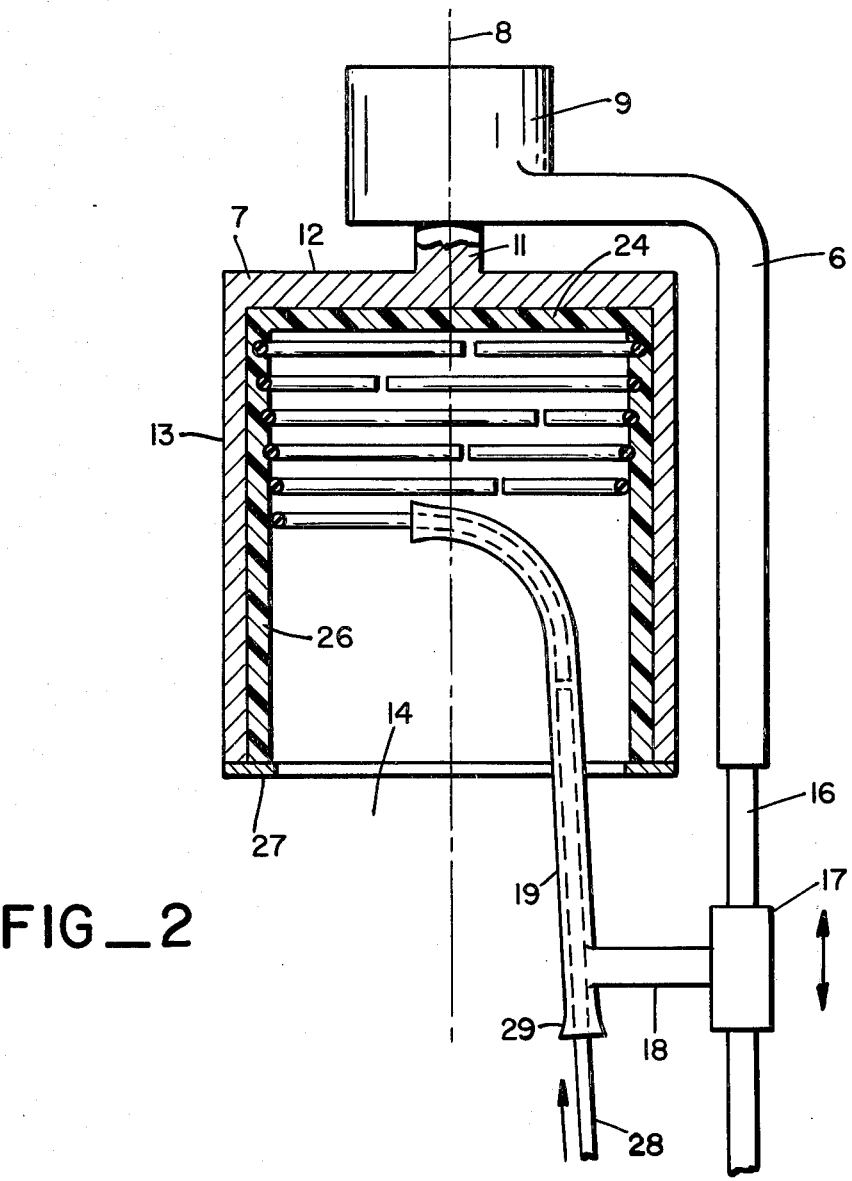
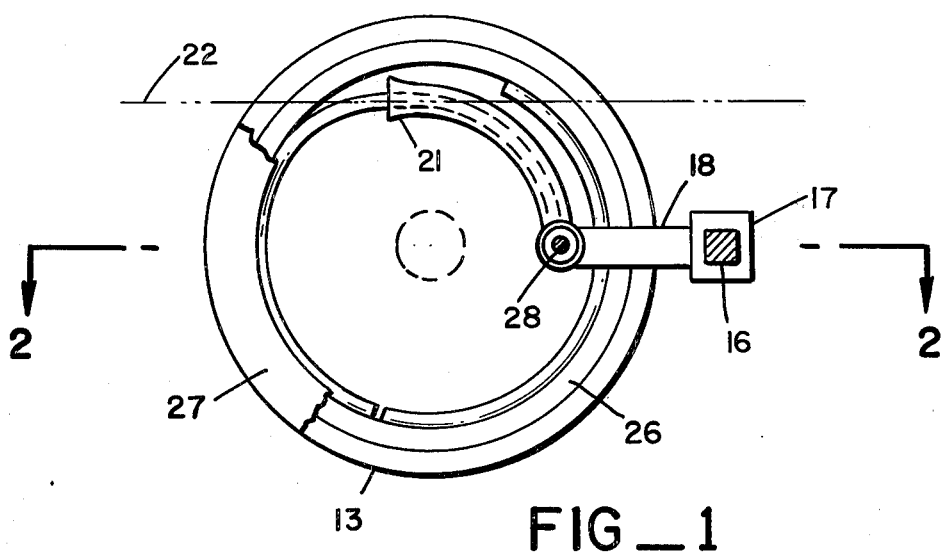

TUBULAR MEMBER AND PROCESS OF FORMING A TUBULAR MEMBER

In the manufacture of tubular shapes or members such as tanks, vessels, pipes and the like, it has been customary to afford a matrix of time-setting, liquid material of a particular shape or form and to embed in the liquid material short lengths of chopped fiber glass. Commercially available fiber glass roving strips are mechanically severed or cut into short lengths and forcibly thrown into the liquid matrix at random. The resulting member is reinforced by short fibers extending in all directions or heterogeneously. This is entirely satisfactory for many different purposes yet in some instances does not exhibit the circumferential strength or hoop strength preferred in vessels circular in transverse cross-section and required to withstand substantial pressure from within.

It is therefore an object of the invention to provide a process and product of improved character in connection with a tubular form comprised of roving and a time-setting material.

Another object of the invention is to provide a fast, effective and uniform process for providing a tubular member.

Another object of the invention is to provide such a process that is easily set up with relatively simple machinery and that can be practiced by relatively unskilled operators.

A further object of the invention is in general to provide an improved process for affording a tubular member.

A still further object of the invention is to provide an improved tubular member.

Other objects, together with the foregoing, are attained in the embodiment of the invention and the practice of the process described in the accompanying description and illustrated in the accompanying drawings, in which:

FIG. 1 is an end elevation, partly diagrammatic, of a device for use in practicing the process of the invention and producing the product thereof; and FIG. 2 is a cross-section, the plane of which is indicated by the line 2—2 of FIG. 1, certain portions being shown in elevation, other portions being broken away, and some parts being illustrated diagrammatically.

For convenience in description herein and in the claims various geometric relationships and terms are used. These are utilized, in some instances, as approximations for explanation since rigid, mathematical adherence thereto is not always necessary or desired.

In an exemplary installation of a mechanism used in practicing the process and producing the product, there is provided a frame 6 on any suitable support. On the frame is journalled a tubular form 7 mounted to rotate relative to the frame 6 about an axis 8. For example, the axis may be considered to extend horizontally, or nearly so. Included in a housing 9 on the frame is a driving mechanism (not shown) for turning the hub 11 and the form 7 at a desired rate. The form 7 includes an approximately planar, disc-like bottom 12, usually of circular configuration. From the bottom there is an upstanding, circular-cylindrical wall 13 concentric with the axis 8. In actual practice the disc 12 need not have exactly planar bounding surfaces and sometimes such surfaces are shallowly conical. Also, the form wall 13 is usually not in practice of a constant diameter throughout its length but rather expands or enlarges toward the open, outer end 14 so that it is actually a truncated cone.

Mounted on a guide portion 16 of the frame 6 is a carriage 17 preferably non-rotatable and movable parallel to the axis 8 for a distance a little greater than the length or depth of the form. Supported on the axially movable carriage 17 by a bracket 18 is a feed tube 19. This extends approximately parallel to the axis 8 for its initial portion and then curves gently, as shown in both figures, into a position so that the flared feed tube outlet 21 extends along and terminates approximately coaxially with or concentrically with a chordal line 22 extending across the form, or lying substantially in a plane normal to the axis 8 and situated close to the form wall.

In the operation of this device the driving mechanism is started and the form is brought up to an appropriate rotary speed. There is provided a suitable bottom structure 24. This may be preformed and pre-introduced as a finished disc or can be cast in place when the tubular form is stationary or is turning slowly. A parting compound is placed between the bottom structure 24 and the permanent form bottom 12. In making pipe, the structure 24 is omitted. When the form 7 is rotating there is introduced into it a liquid material of a sort effective to set into a solid in a predetermined span of time. Some of the epoxy resins, for example, are appropriate materials to introduce into the drum.

Since the material is introduced in liquid form, it is spun out centrifugally and forms a generally tubular layer 26 on the inside surface. If necessary, the form is provided with a removable rim 27 which spins with the form and is effective as a barrier or dam to confine the end of the spinning liquid layer 26. The layer 26 may have a somewhat conical exterior configuration if that is the shape of the form but the layer is usually close to a relatively uniform cylinder in configuration. The layer unites directly with the base 24, if such a base or end is used.

As the form 7 is spinning and when the liquid material has been distributed over the interior thereof, there is introduced an appropriate reinforcing material. This, for example, is fiber glass roving. The roving is commercially available in long lengths with the individual glass fibers extending generally along the length of the roving and intertwined and sometimes slightly twisted to maintain the rope-like nature of the roving.

The roving 28 is introduced into the enlarged end 29 of the guide 19 and is advanced therein in an axial direction and is then turned by the guide to emerge from the enlarged end 21 to travel cross-wise and generally along the chordal line 22. The emerging roving tends to emerge at less than the peripheral speed of the inside surface of the form but is caught up in the liquid layer 26 and is entrained therewith. The roving tends to turn with and at substantially the same rate as the spinning liquid 26. The direction that the roving advances is approximately in a plane normal to the axis 8. The roving, as it is caught up, tends to be whipped into position so that the fibers lie generally peripherally or circumferentially on the inside of the form. Because of the centrifugal force the roving tends to embed itself more and more in the liquid layer and to move radially outwardly of the drum.

The roving strip 28 preferably is cut at long intervals to have a strip length of the order of a half or so of the diameter of the form. This is not a precise measurement but is intended to distinguish radically from chopped roving, the individual, short fibers of which would align at random in the matrix formed by the liquid. In the present instance the roving strip between cuts is long enough so that the fibers comprised in it generally lie circumferentially or in a plane normal to the axis. However, the strip is also short enough so that an individual length is less than a complete hoop and can yield bodily to centrifugal force. Each strip or length can travel radially outwardly from the inner surface of the layer 26 to embed in the central portion thereof. It is sometimes possible to use longer lengths of roving—even longer than a full circle—but some radial or circumferential expansion should then be provided for to accomplish proper embedding of the roving.

To accomplish the desired result the operator feeds in successive strips 27 of roving to the spinning form. They follow each other end to end in close succession, preferably so closely that there is no substantial gap. However, each strip of emplaced roving takes on an arcuate contour, when seen in end elevation, and acts as a partial hoop. As the roving is fed through the guide 19 the carriage 17 is axially advanced slowly. The successive roving strips actually describe or fall into a helix or take on a helical configuration. An individual turn of the helix is nearly flat but there is some axial advancement. The successive roving strips ultimately lie side by side in the matrix and eventually provide a reinforcement throughout the entire cylindrical interior thereof and become substantially embedded therein. The interior surface of the layer 26, when finished, is smooth and uninterrupted.

The matrix liquid material gradually becomes more nearly solid or set with the passage of time. Shortly after the conclusion of the positioning of the roving the matrix is solid.

As soon as the matrix has set sufficiently to be a shape retaining body, the carriage 17 is moved to extract the guide tube 19 from the interior of the mold and is moved to one side. The layer 26 with the embedded reinforcement is then withdrawn as a body from the stationary mold. The initial use of parting compound effectively assists the separation. The bottom disc 24, if used, comes with the layer 26. If a tube is being made there is no bottom 24. When the tubular member has been withdrawn from the mold the tubular guide 19 can be repositioned and the process can be repeated.

The resulting product is a tube, with or without a bottom, of a set material in which is embedded partial hoops or helical portions of a fiber glass or comparable reinforcement centrifugally positioned and located generally in a circumferential (helical) direction. Preferably, the various strips of roving are introduced in such a fashion and close enough to each other so that, where fibers end, they tend to interlock or interengage. This adds strength in an axial direction.

In some instances, but a single layer of roving lengths is used and can be located as desired in the thickness of the wall; that is, near the outside, near the inside or in between. In other instances, the process can be augmented to supply two or more layers of roving in the wall. For example, it is often effective to locate one layer of roving near the outer wall surface, and another layer of roving near the inner wall surface with plastic or other filler material in between those layers. Also, by reversing direction of feed and rotation from layer to layer, the roving lie and orientation can be changed.

What is claimed is:

1. A process of forming a tubular member comprising rotating a tubular form about a central axis, providing the interior surface of said rotating form with a coating of time-setting liquid material, embedding a free-ended strip of reinforcing roving having a length of the order of one-half the diameter of said form into said liquid coating on the interior of said rotating form by an endwise motion of said strip in an approximately chordal direction, continuing rotating said form while said strip is embedded substantially circumferentially in said coating by centrifugal force alone and until said coating is set enough to retain the shape of said form, and then separating the set material and roving embedded therein from said form.

2. A process as in claim 1 including repeating said embedding step with successive roving strips disposed initially end to end and lying adjacent each other.

3. A process as in claim 2 including repeating said embedding step sufficiently to provide a multi-turn helix of said successive roving strips embedded in said material.

4. A process as in claim 3 including embedding said successive roving strips with the successive turns of said helix substantially in abutment with each other.

* * * * *